United States Patent [19]
Bukoschek et al.

[11] Patent Number: 5,549,042
[45] Date of Patent: Aug. 27, 1996

[54] DOMESTIC APPLIANCE FOR MAKING ICE-CREAM

[75] Inventors: Romuald L. Bukoschek, Klagenfurt; Reinhard Prandl, Ferlach; Martin Sonnek, St. Veit/Glan, all of Austria

[73] Assignee: U.S. Philips Corporation, New York, N.Y.

[21] Appl. No.: 539,947

[22] Filed: Oct. 6, 1995

[30] Foreign Application Priority Data

Oct. 12, 1994 [AT] Austria ................................ 1929/94

[51] Int. Cl.⁶ .................... A23C 3/04; B01F 7/00; B01F 7/16; A23G 9/00
[52] U.S. Cl. ................... 99/455; 62/342; 99/348; 366/144; 366/149; 366/314; 366/601
[58] Field of Search ................. 99/325–332, 348, 99/452–455, 466, 468; 62/342, 343, 136; 74/664, 665 L, 661; 366/144, 149, 98, 314, 601; 318/282

[56] References Cited

U.S. PATENT DOCUMENTS

| 4,070,957 | 1/1978 | Korekawa et al. ............... 99/455 |
| 4,311,472 | 1/1982 | Courtenay ....................... 74/665 L |
| 4,653,928 | 3/1987 | Bravo ............................ 366/601 |
| 4,696,166 | 9/1987 | Bukoschek et al. ............. 62/343 X |
| 4,828,326 | 5/1989 | Schupphaus et al. ............ 74/661 |
| 4,920,761 | 5/1990 | Bukoschek et al. ............. 62/342 |
| 5,022,315 | 6/1991 | Bertram et al. ................ 99/348 |
| 5,410,129 | 4/1995 | Kersten et al. ................ 99/325 X |
| 5,447,371 | 9/1995 | Agapiou ....................... 366/149 X |

FOREIGN PATENT DOCUMENTS 0140439  5/1985  European Pat. Off. .
3400572  7/1984  Germany .

OTHER PUBLICATIONS

Philips Catalog Ice Cream Maker HR 2302, 1992.

*Primary Examiner*—Timothy F. Simone
*Attorney, Agent, or Firm*—Ernestine C. Bartlett

[57] ABSTRACT

A domestic appliance (1) for making ice-cream is provided, comprising a motor (8), a stirring tool (12) drivable by the motor(8), and switching means (69) for starting a first mode of operation of the domestic appliance (1), in which mode the stirring tool (12) can be driven with a speed n (21 r.p.m.) within a speed range, the switching means (69) are adapted to start a further mode of operation of the domestic appliance, in which further mode the stirring tool (12) can be driven with at least one further speed (71 r.p.m.) within a further speed range, and wherein there has been provided a time control device (66) by means of which the drive of the stirring tool (12) with the further speed n (71 r.p.m.) can be limited to a given time interval (T).

11 Claims, 3 Drawing Sheets

DOMESTIC APPLIANCE FOR MAKING ICE-CREAM

FIELD OF THE INVENTION

The invention relates to a domestic appliance for making ice-cream, comprising a motor, a stirring tool drivable by the motor, and switching means for starting a mode of operation of the domestic appliance, in which mode of operation the stirring tool is drivable with at least one speed within one speed range, at which speed ice-cream of a comparatively dense and comparatively solid consistency is made.

BACKGROUND OF THE INVENTION

A domestic appliance of the type defined in the opening paragraph has been marketed by the Applicant as a so-called ice-cream maker, for example under the type number HR 2302, and is known therefrom. The motor of the known ice-cream maker is a single-phase synchronous motor by means of which a stirring tool of the ice-cream maker can be driven via a transmission. The known appliance has a manually operated two-position slide switch as switching means for starting and stopping a mode of operation of the ice-cream maker. After the mode of operation of this ice-cream maker has been started by means of this slide switch the ice-cream maker is powered directly from an a.c. mains voltage source and its rotor rotates with a constant speed defined by the mains frequency, so that the stirring tool, which is driven by the single-phase synchronous motor via the transmission, is also driven with a constant speed, which in the present case has a nominal value of approximately 21 r.p.m. With the stirring tool, which is rotatably mounted in a receptacle to be filled with a liquid starting substance and which is constructed not only as a stirring tool but also as a scraping tool, the starting substance, while constantly refrigerated, is applied to at least one wall in the receptacle by the stirring movement of the stirring tool and is subsequently scraped off this wall by the scraping action of the stirring tool which also forms a scraping tool. This process continues until the user has observed such a solid consistency of the ice-cream formed during said stirring and scraping process that he stops this process by turning off the single-phase synchronous motor by again actuating the slide switch of the ice-cream maker serving as the switching means for starting and stopping a mode of operation. Owing to the low speed of the stirring tool, at which only a comparatively small quantity of air can be introduced into and mixed with the starting substance and the slowly solidifying ice-cream substance, a comparatively dense and comparatively solid ice-cream can be made by means of the known ice-cream maker, which is not appreciated by many users because such ice-cream is relatively cold and relatively hard in the mouth.

SUMMARY OF THE INVENTION

An object of the invention is to remove the above restraint and to improve a domestic appliance of the type defined in the opening paragraph by simple means in such a manner that it is possible to make to not only comparatively dense and comparatively solid ice-cream. To this end the invention is characterized in that (1) the switching means are adapted to start a further mode of operation of the domestic appliance, in which further mode of operation the stirring tool is drivable by the motor with at least one further speed within a further speed range, the at least one further speed within the further speed range being higher than the at least one speed within the one speed range, and ice-cream of a comparatively fluffy and a comparatively soft consistency being made at the higher further speed, and in that (2) there has been provided a time control device which can be activated when the further mode of operation of the domestic appliance is started and by means of which the drive of the stirring tool with the at least one further speed in the further mode of operation of the domestic appliance can be limited to a given time interval. In this way it is achieved by very simple means that in a further mode of operation of the domestic appliance the stirring tool can also be driven with a comparatively high speed at which a comparatively large quantity of air is introduced into a starting substance and the slowly forming and solidifying ice-cream substance, so that a comparatively fluffy and comparatively soft ice-cream is obtained. The automatic time limitation of the comparatively rapid drive of the stirring tool ensures that the resulting comparatively fluffy and comparatively soft ice-cream consistency is not impaired by rapid driving of the stirring tool for too long a time. Indeed, a too long rapid drive of the stirring tool would result in a comparatively dense and comparatively solid consistency of the prepared ice-cream. Depending on the mode selected for the drive of the stirring tool a domestic appliance in accordance with the invention enables either a comparatively dense and comparatively solid ice-cream or a comparatively fluffy and comparatively soft ice-cream to be made, which has the advantage that different requirements of users can be met in a simple and easy manner.

It is to be noted that EP-B10 140 439 describes a dual-purpose appliance comprising a motor-driven mixing tool. In this known appliance the mixing tool can be driven selectively either with a comparatively high speed, for ice-cream making, or with a very low speed, for preparing an iced fruit-juice beverage. However, the known appliance is not suited to make either a comparatively dense and comparatively solid ice-cream or a comparatively fluffy and comparatively soft ice-cream. Additionally, the known appliance does not have a time control stage by means of which the comparatively high-speed drive of the mixing tool can be limited in time because such a limitation of the time during which the mixing tool is driven with a comparatively high speed is neither necessary nor useful at any rate, the known dual-purpose appliance not being intended and constructed to prepare ice-cream of a comparatively fluffy and comparatively soft consistency. Conversely, in a domestic appliance in accordance with the invention the stirring tool can be driven with at least two different speeds so as to enable either ice-cream of a comparatively fluffy and comparatively soft consistency or ice-cream of a comparatively dense and comparatively solid consistency to be made. Moreover, in a domestic appliance in accordance with the invention the time during which the stirring tool is driven with the higher of the at least two different speeds is limited by means of a time control stage in order not to impair the comparatively fluffy and comparatively soft consistency of the ice-cream obtained at this speed by driving the stirring tool with the higher speed for too long a time.

It is to be noted also that DE-A1 34 00 572 describes a multi-purpose appliance having a motor-driven drive shaft which is rotationally coupled to a beating tool and to which a stirring tool can be rotationally coupled. In this known appliance the beating tool can be driven with a high speed to mince and mix the ingredients of a starting substance for making ice-cream and the stirring tool can be driven with a low speed to make ice-cream. However, the known appliance is not suitable for making either comparatively dense and comparatively solid ice-cream or comparatively fluffy and comparatively soft ice-cream. Moreover, the known appliance does not have a time control stage by means of which the time during which the beating tool is driven with the high speed can be limited because such a limitation of the time during which the beating tool is driven with a comparatively high speed is neither necessary nor useful at any rate since the known multi-purpose appliance is intended and constructed to prepare ice-cream of a comparatively fluffy and comparatively soft consistency. Conversely, in a domestic appliance in accordance with the invention the stirring tool can be driven with at least two different speeds so as to enable either ice-cream of a comparatively fluffy and comparatively soft consistency or ice-cream of a comparatively dense and comparatively solid consistency to be made. Moreover, in a domestic appliance in accordance with the invention the time during which the stirring tool is driven with the higher of the at least two different speeds is limited by means of a time control stage in order not to impair the comparatively fluffy and comparatively soft consistency of the ice-cream obtained at this speed by driving the stirring tool with the higher speed for too long a time.

In a domestic appliance in which in the one mode of operation the stirring tool is drivable with at least one speed within a speed range between 10 and 30 r.p.m., it has proved to be advantageous if in the further mode of operation the stirring tool is drivable with at least one speed within a speed range between 50 and 90 r.p.m. In practice, this has proved to be very advantageous because in this way a very light and creamy ice-cream is obtained, i.e. an ice-cream of a particularly fluffy and soft consistency.

It has proved to be advantageous if there has been provided a time control device by means of which the drive of the stirring tool with the at least one further speed in the further mode of operation of the domestic appliance can be limited to a given time interval between 15 and 40 minutes. Practical tests have shown that such an embodiment is very favorable because after expiry of a time interval between 15 and 40 minutes very favorable results are obtained as regards a fluffy and soft ice-cream consistency.

An advantageous embodiment is characterized in that the time control device comprises adjustment means by which the given time interval, to which the drive of the stirring tool with the at least one further speed in the further mode of operation of the domestic appliance can be limited, can be adjusted to different values. This enables the time limitation for the process of making comparatively fluffy and comparatively soft ice-cream to be adapted relatively simply to different recipes and different quantities of starting substance.

A further advantageous embodiment is characterized in that there has been provided a control device by which in the further mode of operation of the domestic appliance, after the given time interval, to which the drive of the stirring tool with the at least one further speed in the further mode of operation of the domestic appliance can be limited, has expired the domestic appliance can be set to drive the stirring tool, as in the one mode of operation, with the at least one speed within the one speed range. In this way it is achieved that if the comparatively fluffy and comparatively soft ice-cream thus obtained is not removed by the user of the domestic appliance immediately after the relatively rapid drive of the stirring tool has stopped but is left in the appliance, this does not lead to undesirable freezing of the obtained ice-cream onto a refrigerated receptacle or refrigerating cartridge of the domestic appliance and no undesirable solidification of the fluffy ice-cream occurs.

BRIEF DESCRIPTION OF THE DRAWINGS

The invention will be described in more detail hereinafter with reference to an embodiment shown in the drawings and given by way of non-limitative example.

DETAILED DESCRIPTION OF THE PREFERRED EMBODIMENTS

Figure 1:
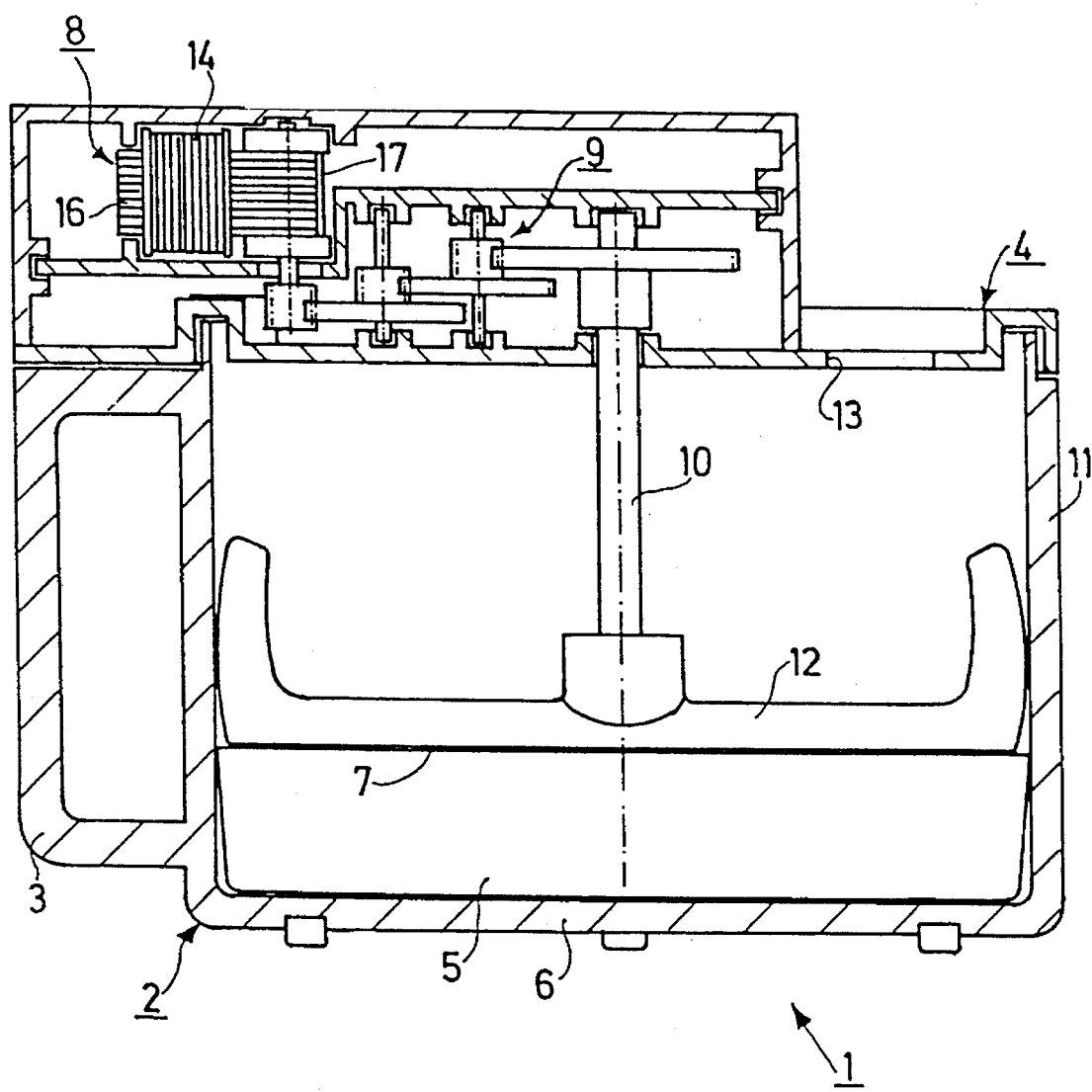
FIG. 1 is a somewhat diagrammatic and partly cross-sectional view showing a domestic appliance in accordance with the invention.

FIG. 1 shows diagrammatically a domestic appliance 1 for making ice-cream, which is often referred to as an ice-cream maker. The domestic appliance 1 comprises a thermally insulated bowl-shaped receptacle 2 having a handle 3. The receptacle 2 can be closed by means of a cover 4, which can suitably be locked to the receptacle 2. A discoid cold cartridge 5 containing a latent heat storage medium is arranged in the receptacle 1 and can be removed from the receptacle 2 in order to be cooled in a freezer compartment of a refrigerator. The surface 7 of the cold cartridge 5 which is remote from the bottom 6 of the receptacle 2 forms a refrigerating surface which serves for the formation of ice-cream. The cover 4 of the domestic appliance 1 accommodates an electric motor 8, which drives a shaft 10 via a gear transmission 9, which shaft is centered relative to the receptacle 2. The shaft 10 is fixedly connected to a scraping and stirring tool 12, which is adapted to cooperate with the cooled surface 7 of cold cartridge 5 serving for ice-cream formation and the cylindrical receptacle wall 11. If required, the electric motor 8 together with the gear transmission 9 may be constructed as a unit which is detachable from the cover 4. Likewise, the shaft 10 may be detachable from the gear transmission 9, to which it can be coupled by plug-socket means. A spring means may be arranged between the gear transmission 9 and the shaft 10 to provide the spring pressure for keeping the scraping and stirring tool 12 in engagement with the cooled surface 7 of cold cartridge 5 serving for ice-cream formation, in order to ensure that the ice-cream forming on the cold cartridge 5 is scraped off very effectively.

Before the domestic appliance 1 is put into operation the cold cartridge 5 is cooled, for example in a freezer compartment of a refrigerator, and is subsequently placed in the receptacle 2 of the domestic appliance 1. Then, the cover 4 with the scraping and stirring tool 12 connected to the gear transmission 9 is placed onto the receptacle 1. After this, starting substance for ice-cream is poured in through a filling aperture 13 formed in the cover 2. When the electric motor 8 is switched on the scraping and stirring tool 12 starts to rotate, causing the starting substance to be mixed and the ice-cream forming on the cold cartridge 5 to be scraped off and mixed again with the mixture. This process continues until only ice-cream of the required temperature and consistency is available.

The electric motor 8 in the domestic appliance 1 is an electronically commutatable d.c. motor having two stator coils 14 and 15, of which only the stator coil 14 is visible in FIG. 1. The stator coils 14 and 15 are arranged, in known manner, on a basically U-shaped laminated stator 16, a rotatably supported rotor 17 being mounted between the free ends of the two limbs of the stator 16. The rotor 17 is made of a permanent-magnetic material and is magnetized, in known manner, transversely of its rotor axis so as to form two poles. In the direct proximity of the rotor 17 the electric motor 8 has a Hall-sensor device 18 (see FIG. 2), which is commercially available, for example under the type designation DN6851. The Hall-sensor device 18 enables the two magnet poles, i.e. the north pole and the south pole, of the rotor 17 of the electric motor 4 and hence the position of the rotor 17 relative to the stator 16 to be detected. The Hall-sensor device 18 serves for controlling the commutation of the electric motor 8 formed by an electronically commutatable d.c. motor, which is a method which has been known per se a long time and which will be discussed in more detail in the description of the electric circuit 19 of the domestic appliance 1 with reference to FIG. 2.

The electric circuit 19 of the domestic appliance 1 shown in FIG. 1 will now be described with reference to FIG. 2. The electric circuit 19 has two terminals 20 and 21 for connection to an a.c. mains. A PTC element 22 connected to the terminal 20 ensures switching off in the event that the motor is overloaded. The PTC element 22 is followed by a rectifier bridge 23, to which a filter capacitor 24 is connected. A direct voltage VM of approximately +325 V available across the filter capacitor 24 serves as the supply voltage for the electric motor 8.

The PTC element 22 is further followed by a rectifier stage 27 comprising a resistor 25 and a capacitor 26, a node 28 between the resistor 25 and the capacitor 26 carrying a direct voltage V1 of approximately +14 V which has only a low residual ripple and which is stabilized in a manner described below. The node 28 is connected to the cathode of a zener diode 29, which produces a direct voltage V2 of approximately +10 V on a circuit point 30. The point 30 is connected to the cathode of a further zener diode 31, which produces a direct voltage VCC of approximately +5 V on a circuit point 32.

Figure 2:
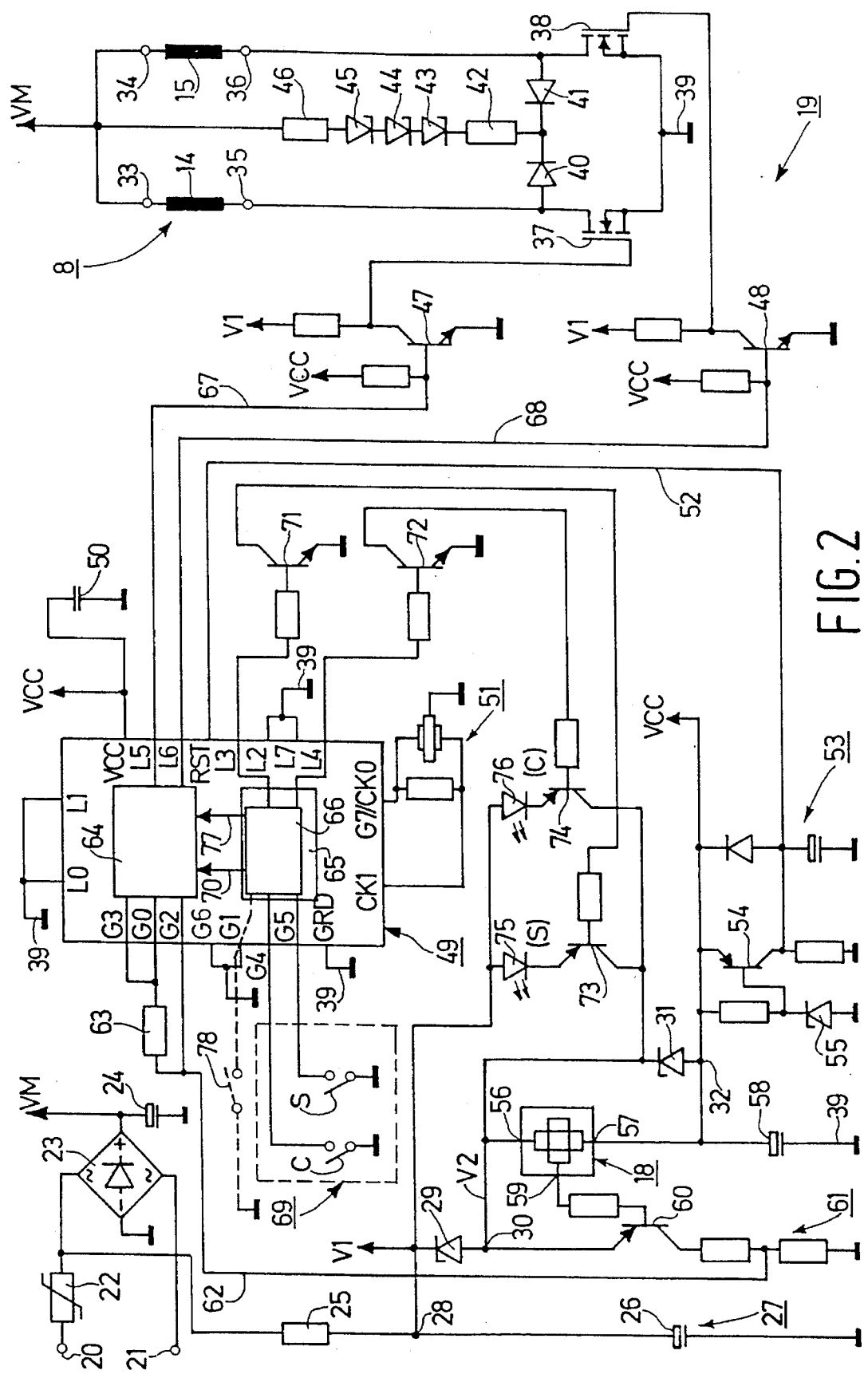
FIG. 2 is a circuit diagram of the electric circuit of the domestic appliance shown in FIG. 1.

As is shown in FIG. 2, the direct voltage VM is applied to terminals 33 and 34 of the two stator coils 14 and 15 of the motor 8. The two other terminals 35 and 36 of the two stator coils 14 and 15 are each connected to the ground terminal 39 of the domestic appliance 1 via a power FET 37 and 38, respectively. The two power FETs 37 and 38 are alternately turned on and turned off, as a result of which, in principle, each time one of the two stator coils 14 and 15 is cyclically connected to the direct voltage VM. Thus, commutation is effected by means of the two power FETs 37 and 38.

During commutation, in principle, each time one of the two stator coils 14 and 15 is connected to the direct voltage VM and the other one of the two coils 14 and 15 is disconnected from the direct voltage VM. When one of the coils 14 or 15 is disconnected from the direct voltage VM an induced voltage will appear in the relevant coil, which in the present electric motor 8 causes a current to flow via each time one of the two diodes 40 and 41 and a series arrangement of a resistor 42, three diodes 43, 44, 45 and a further resistor 46. By means of this current the energy stored in the previously disconnected stator coil 14 or 15 is convened in the two resistors 42 and 46. Such a measure has been known a long time and is customary. To control the two power FETs 37 and 38 two switching transistors 37 and 38 have their collectors connected to the direct voltage V1 and their bases to the direct voltage VCC via a resistor each.

The circuit 19 of the domestic appliance 1 comprises a microprocessor 49, which in the present case is a microprocessor which is commercially available under the type designation COP912CN. The two terminals L0 and L1 of the microprocessor 41 are connected to the ground terminal 39. The terminals G1 and G6, L2 and L7 as well as GRD (ground) are likewise connected to the ground terminal 39. The direct voltage VCC is applied to the terminal VCC, which terminal is connected to a storage capacitor 50, which in known manner stores the supply voltage VCC for the microprocessor 49 to allow for the situation in which the microprocessor 49 briefly requires more current. A resonator 51, required for the operation of the microprocessor 49, is connected to the two terminals CK1 and G7/CKO and generates a clock signal with a clock frequency of approximately 6 MHz. The terminal RST (reset) is connected to a reset circuit 53 via a line 52, which circuit is connected to the direct voltage VCC produced on the circuit point 32. The reset circuit 53 comprises a normally conductive transistor 54 having its base connected to the cathode of a further zener diode 55. In the event of a mains failure the transistor 54 is cut off, as a result of which the microprocessor 49 receives a reset signal via the line 52 in order to reset the microprocessor 49.

The above-mentioned stabilization of the direct voltage V1 appearing on the circuit point 28 will now be described in more detail. The stabilization of this direct voltage V1 is effected in a simple manner by means of the series arrangement of the following elements, which are also used for other purposes. These elements are: the zener diode 29, the further zener diode 31, the transistor 54 and the further zener diode 55.

The circuit point 30 is connected to a first supply terminal 56 of the Hall-sensor device 18, whose second supply terminal 57 is connected to the circuit point 32 and, via a capacitor 58, to the ground terminal 39. As already stated, the Hall-sensor device 18 detects the two magnet poles of the rotor 17 of the electric motor 4, the Hall-sensor device 18 producing a squarewave sensor signal at an output 59, which when for example the north pole is detected changes from the value of the direct voltage VCC to the value of the direct voltage V2 and when subsequently the south pole is detected changes from the value of the direct voltage V2 to the value of the direct voltage VCC. This sensor signal is applied to the base of a transistor 60, which is consequently switched between its on-state and its off-state, as a result of which a control voltage is generated across a voltage divider 61 connected to the collector of the transistor 60, which control voltage is applied to the terminals G2 and G0, which are used as inputs of the microprocessor 49, via a line 62. A resistor 63 is then connected to the terminal G0 and the terminal G0 is connected to the terminal G3 used as an output of the microprocessor 49.

As is shown diagrammatically in FIG. 2, a part of the microprocessor 49 is configured as a speed control device 64 and a further part of the microprocessor is configured as a mode control device 65, the mode control device 65 with another part of the microprocessor forming a time control device 66. The control signals appearing at the terminals G2 and G0 are applied to the part of the microprocessor 49 configured as the speed control device 64 in order to control the commutation of the two stator coils 14 and 15 of the electric motor 8. The part of the microprocessor 49 configured as the speed control device 64 is adapted to generate two alternately appearing substantially rectangular speed control signals, the speed of the electronically commutatable electric motor 8 being defined by the frequency of these speed control signals. In normal operation a pause interval, in which neither of the two speed control signals appears, may occur between the time intervals in which the two speed control signals occur alternately, as a result of which the two power FETs 37 and 38 are cut off in each of these pause intervals. The microprocessor 49 supplies the alternately appearing speed control signals to its terminals L5 and L6 and, via two lines 47 and 48, they are applied to the bases of the switching transistors 47 and 48 to control the states of these two transistors 47 and 48 and hence those of the two power FETs 37 and 38.

The domestic appliance 1 has switching means 69 for selecting modes of operation of the appliance 1. These switching means 69 comprise a first touch control C for selecting a first mode of the domestic appliance 1 and a second touch control S for selecting a second mode of the appliance 1. If desired, the domestic appliance 1 may comprise further touch controls for the selection of further modes of operation of the domestic appliance 1. By means of the touch control C the first mode of the domestic appliance 1 can be selected, in which a comparatively compact (compact=C) ice-cream of a comparatively dense and comparatively solid consistency can be made by means of the domestic appliance 1. By means of the touch control S the second mode of the domestic appliance 1 can be selected, in which a comparatively soft (soft=S) ice-cream of a comparatively fluffy and comparatively soft consistency can be made by means of the domestic appliance 1. The touch control C is connected to a terminal G4 of the microprocessor 49. The touch control S is connected to a terminal G5 of the microprocessor 49. By actuation of one of the two touch controls C and S one of the two terminals G4 and G5 can be connected to ground potential, which represents control information for the part of the microprocessor 49 configured as the mode control device 65. It is to be noted that re-actuation of one of the two touch controls C and S, after this touch control has been actuated to start one of the modes, results in the previously started mode being stopped.

Figure 3:
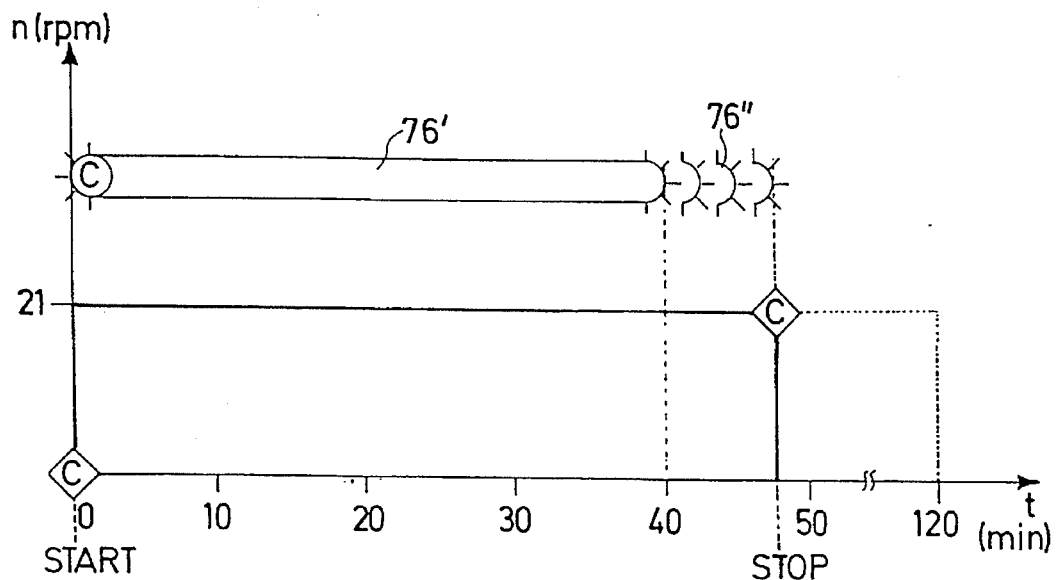
FIG. 3 is a diagram representing the speed of the stirring tool of the domestic appliance shown in FIG. 1 in a first mode of operation as a function of the operating time of the appliance.

When the touch control C is actuated to start the first mode of operation of the domestic appliance 1 the control information thus generated is detected in the part of the microprocessor 49 configured as the mode control device 65. In response to this the mode control device 65 formed by a part of the microprocessor 49 supplies control information, via a diagrammatically shown control connection 70, to the part of the microprocessor 49 configured as the speed control device 64, upon which the part of the microprocessor 49 configured as the speed control device 64 generates two alternately appearing speed control signals, which are applied to the switching transistors 47 and 48 via lines 67 and 68, as a result of which the power FETs 37 and 38 are alternately driven into the on-state and the off-state, respectively. The frequencies of the generated speed control signals are selected in such a manner that the rotor 17 of the electric motor 8 is driven with approximately 3000 r.p.m. and that, via the gear transmission 9, the stirring tool 12 of the domestic appliance 1 is driven with a speed n within a speed range, as is shown in FIG. 3 as a function of the operating time. As is apparent from FIG. 3, the stirring tool is driven in a speed range between 10 and 30 r.p.m., namely with a nominal speed n of 21 r.p.m. in the present case.

The mode control device 65 formed by a part of the microprocessor 49 is further configured to generate indicator control signals. These indicator control signals are supplied from the mode control device 65 formed by a part of the microprocessor 49 to two terminals L3 and L4 of the microprocessor 49 and from these terminals to a respective switching transistor 71 or 72. The two switching transistors 71 and 72 each control two further transistors 73 and 74, which are arranged in series with two light-emitting diodes (LEDs) 75 and 76. The indicator control signals are formed either by direct voltages or by squarewave-pulse signals, an indicator control signal in the form of a direct voltage causing the relevant LED to be lit constantly and an indicator control signal in the form of a squarewave-pulse signal causing the relevant LED to blink.

After the first mode of the domestic appliance 1 has been started by actuation of the touch control C at a starting instant as represented diagrammatically in FIG. 3, the mode control device 65 formed by a part of the microprocessor 49 supplies an indicator control signal in the form of a direct voltage via the terminal L4, causing the LED 76 to be lit constantly via the transistor 72 and the transistor 74, as is shown diagrammatically in FIG. 3 by a bar 76'. As stated, the mode control device 65 formed by a part of the microprocessor 49 in conjunction with another part of the microprocessor is also configured as a time control device 66, which generates multiple time control information. After the first mode of the domestic appliance 1 has been started by actuation of the touch control C the part of the mode control device 65 configured as the time control device 66 supplies time control information after expiry of forty (40) minutes, as a result of which the indicator control signal at the terminal L4 changes from a direct voltage signal to a squarewave signal, so that the LED 76 will blink after the supply of the time control information upon expiry of forty minutes, as is shown diagrammatically by the blinking symbol 76" in FIG. 3. After starting of the first mode of the domestic appliance 1 the LED 76, when constantly lit, thus serves to indicate that the first mode is operative and, when blinking after expiry of forty minutes, to indicate that the comparatively compact ice-cream made in the first mode is ready and should therefore be removed from the domestic appliance 1. If after the LED 76 has begun to blink the touch control C is actuated again at a stopping instant, as is shown diagrammatically in FIG. 3, this will result in the motor 8 being stopped and the LED 76 being turned off, so that the domestic appliance 1 is inoperative, i.e. switched off. If this switching off is inadvertently omitted, the mode control device 65 formed by a part of the microprocessor 49 ensures that the motor 8 and the LED 76 and hence the domestic appliance 1 are turned off after expiry of one hundred and twenty (120) minutes.

Figure 4:
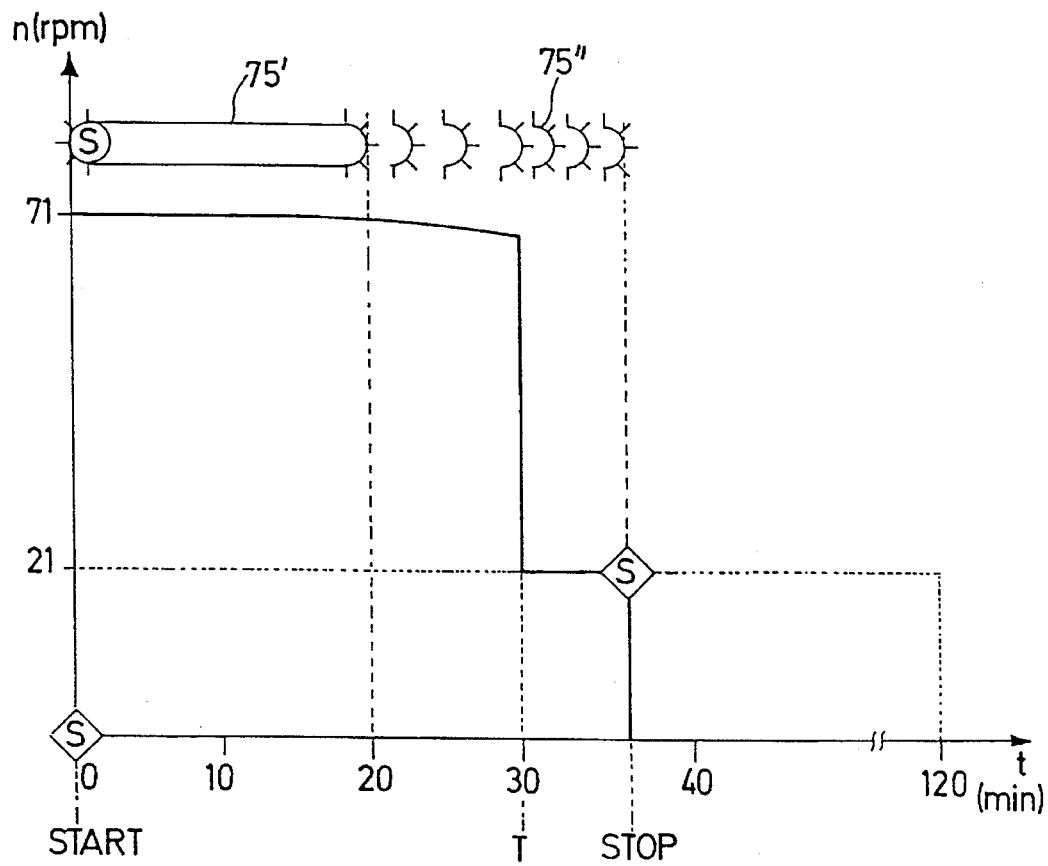
FIG. 4 is a diagram representing the speed of the stirring tool of the domestic appliance shown in FIG. 1 in a second mode of operation as a function of the operating time of the appliance.

When the touch control S is actuated to start the second mode of operation of the domestic appliance 1 the resulting control information is detected in the part of the microprocessor 49 which is configured as the mode control device 65. Subsequently, the part of the microprocessor 49 configured as the mode control device 65 transfers control information to the part of the microprocessor 49 configured as the speed control device 64 via a control connection 77, shown diagrammatically, upon which the part of the microprocessor 49 configured as the speed control device 64 for the time being generates two alternately appearing speed control signals, which are applied to the switching transistors 47 and 48 via the lines 67 and 68, as result of which the power FETs 37 and 38 are alternately turned on and turned off. The frequencies of the initially generated speed control signals are selected in such a manner that the rotor 17 of the electric motor 8 is driven with approximately 10,000 r.p.m. and that, via the gear transmission 9, the stirring tool 12 of the domestic appliance 1 is driven with a further speed n within a further speed range, as is represented in FIG. 4 as a function of the operating time. As is apparent from FIG. 4, the stirring tool 12 is first driven in a further speed range between 50 and 90 r.p.m. in the second mode of the domestic appliance 1, i.e. in the present case with a nominal speed n of 71 r.p.m. at the beginning of a stirring process. As is also apparent from FIG. 4, the initially selected speed n of 71 r.pm. may decrease slightly during operation of the domestic appliance 1, which is caused by an increasingly solid consistency of the originally liquid starting substance for the preparation of ice-cream.

After the second mode of the domestic appliance 1 has been started by actuation of the touch control S at a starting instant as indicated diagrammatically in FIG. 4 the part of the microprocessor 49 configured as the mode control device 65 supplies an indicator control signal in the form of a d.c. signal via the line L3, as a result of which the LED 75 is caused to be lit constantly via the transistor 71 and the transistor 73, as is shown diagrammatically by a bar 75' in FIG. 4. After the second mode of the domestic appliance 1 has been started by actuation of the touch control S the part of the mode control device 65 configured as the time control device 66 supplies time control information after expiry of twenty (20) minutes, as a result of which the indicator control signal at the terminal L3 changes from a d.c. signal to a squarewave signal, so that the LED 75 will blink after the supply of the time control information upon expiry of twenty minutes, as is shown diagrammatically by the blinking symbol 75" in FIG. 4. After starting of the second mode of the domestic appliance 1 the LED 75, when constantly lit, thus serves to indicate that the second mode is operative and, when blinking after expiry of twenty minutes, to indicate that the comparatively fluffy and soft ice-cream made in the second mode is ready and may therefore be removed from the domestic appliance 1.

In the present domestic appliance 1 the part of the mode control device 65 which is configured as the time control device 66 and which can be actuated when the second mode of the domestic appliance 1 is started the drive of the stirring tool 12 with the further speed n of approximately 71 r.p.m. in the second mode of the domestic appliance 1 can be limited to a given time interval T. In the present domestic appliance 1 this time interval T is thirty (30) minutes, as is apparent from FIG. 4. After the second mode of the domestic appliance 1 has been started by actuation of the touch control S at a starting instant as indicated diagrammatically in FIG. 4 the part of the mode control device 65 configured as the time control device 66 supplies time control information after expiry of thirty (30) minutes, which control information is transferred to the part of the microprocessor 49 configured as the speed control device 64 via the control connection 77. In the second mode of the domestic appliance 1, upon expiry of the given time interval T, i.e. after expiry of thirty minutes, to which the drive of the stirring tool 12 with the second speed n of approximately 71 r.p.m. can be limited in the second mode of the domestic appliance 1, the drive of the stirring tool 12 in the domestic appliance 1 with the speed n of 21 r.p.m within a speed range between 10 and 30 r.p.m. can be started, in the same way as in the first mode, by means of the part of the microprocessor 49 configured as the speed control device 64. This starting is effected after the part of the microprocessor 49 configured as the speed control device 64 has received the corresponding time control information via the control connection 77 upon expiry of thirty minutes. Upon receipt of this time control information the part of the microprocessor 49 configured as the speed control device 64 generates two alternately appearing further speed control signals, which are applied to the switching transistors 47 and 48 via the lines 67 and 68, as result of which the power FETs 37 and 38 are alternately turned on and turned off. The frequencies of the generated further speed control signals are selected in such a manner that the rotor 17 of the electric motor 8 is driven with approximately 3000 r.p.m. after expiry of the thirty minutes and that, via the gear transmission 9, the stirring tool 12 of the domestic appliance 1 is driven with the speed n of approximately 21 r.p.m. During and after the change-over of the stirring tool 12 from the higher speed before expiry of the thirty minutes to the lower speed after expiry of the thirty minutes the generation of the indicator control signal for the LED remains unchanged, so that a squarewave indicator control signal appears on the terminal L3, which signal causes the LED 75 to blink via the transistors 71 and 73, as is shown diagrammatically by the blinking symbol 75" in FIG. 4. If subsequently the touch control S is actuated again at a stopping instant, as is shown diagrammatically in FIG. 4, this will result in the motor 8 and the LED 75 being turned off, so that the domestic appliance 1 is inoperative, i.e. switched off. If this switching off is inadvertently omitted, the mode control device 65 formed by a part of the microprocessor 49 ensures that the motor 8 and the LED 75 and hence the domestic appliance 1 are turned off after expiry of one hundred and twenty (120) minutes.

In the domestic appliance 1 described above the given time interval T after which upon starting of the second mode the speed of the stirring tool is changed over from a higher speed to a lower speed is fixed at thirty minutes. However, suitably the time control device 66 may include adjustment means by which the given time interval T, to which the drive of the stirring tool with the higher speed can be limited in the second mode of the domestic appliance 1, can be set to different values. Such an adjustment means may be, for example, a further touch control 78, as is shown diagrammatically by a broken line in FIG. 2. Such a touch control 78 may be connected to, for example, the terminal G1 of the microprocessor 49 and the control information generated by means of this further touch control 78 may be applied to the mode control device 65 and, particularly, the time control device 66 forming part of the mode control device 65. For example, it is possible to provide an arrangement such that upon a repeated brief actuation of the further touch control 78 the given time interval T is reduced and upon a repeated longer actuation of the further touch control 78 the given time interval T is increased.

In the domestic appliance for making ice-cream described above with reference to FIGS. 1 to 4 it is achieved by simple means that depending on the selected mode of operation for the drive of the stirring tool either a comparatively dense and comparatively solid ice-cream (compact ice) or a comparatively fluffy and comparatively soft ice-cream (soft ice) can be made, which has the advantage that it is simply and readily possible to meet different requirements from users. In the first mode of the domestic appliance described above, in which the stirring tool is driven with a comparatively low speed of approximately 21 r.p.m., this comparatively low speed ensures that during ice-cream making only a comparatively small quantity of air is introduced into and mixed with the starting substance and the slowly solidifying ice-cream mixture, so that a comparatively dense and comparatively solid ice-cream is obtained. In the second mode of the domestic appliance described above, in which the stirring tool is initially driven with a comparatively high speed of approximately 71 r.p.m., this comparatively high speed of the stirring tool ensures that comparatively much air is introduced into and mixed with the starting substance and the slowly forming and solidifying ice-cream mixture, so that a comparatively fluffy and comparatively soft ice-cream is obtained. The automatic time limitation of the comparatively rapid drive of the stirring tool ensures that the resulting comparatively fluffy and comparatively soft ice-cream consistency is not impaired by rapid driving of the stirring tool for too long a time. Since in the domestic appliance described above the given time interval in which the stirring tool is driven with the comparatively high speed is followed by a comparatively low-speed drive of the stirring tool in accordance with the first mode, it is thus achieved that the resulting comparatively fluffy and comparatively soft ice-cream consistence is maintained and no undesirable freezing of the obtained ice-cream onto the receptacle or the refrigerating cartridge of the domestic appliance occurs.

The invention is not limited to the domestic appliance described hereinbefore. For example, in a modification of the above appliance it is also possible to achieve that if the control element for starting the first mode is actuated while the domestic appliance is already in the second mode this actuation immediately results in a change from the high speed to the low speed of the stirring tool, so that a manual change-over from soft-ice making to compact-ice making is obtained.

The invention claimed is:

1. A domestic appliance for making ice-cream, comprising a motor, a stirring tool drivable by the motor, and switching means for starting a mode of operation of the domestic appliance, in which mode of operation the stirring tool is drivable with at least one speed within one speed range, at which speed ice-cream of a comparatively dense and comparatively solid consistency is made, wherein the switching means are adapted to start a further mode of operation of the domestic appliance, in which further mode of operation the stirring tool is drivable by the motor with at least one further speed within a further speed range, the at least one further speed within the further speed range being higher than the at least one speed within the one speed range, and ice-cream of a comparatively fluffy and a comparatively soft consistency being made at the higher further speed, and wherein there has been provided a time control device which can be activated when the further mode of operation of the domestic appliance is started and by means of which the drive of the stirring tool with the at least one further speed in the further mode of operation of the domestic appliance can be limited to a given time interval.

2. A domestic appliance as claimed in claim 1, in which in the one mode of operation the stirring tool is drivable with at least one speed within a speed range between 10 and 30 r.p.m., and in the further mode of operation the stirring tool is drivable with at least one speed within a speed range between 50 and 90 r.p.m.

3. A domestic appliance as claimed in claim 1 which comprises a time control device by means of which the drive of the stirring tool with the at least one further speed in the further mode of operation of the domestic appliance can be limited to a given time interval between 15 and 40 minutes.

4. A domestic appliance as claimed in claim 1 wherein, the time control device comprises adjustment means by which the given time interval, to which the drive of the stirring tool with the at least one further speed in the further mode of operation of the domestic appliance can be limited, can be adjusted to different values.

5. A domestic appliance as claimed in claim 1 which comprises, a control device by which in the further mode of operation of the domestic appliance, after the given time interval, to which the drive of the stirring tool with the at least one further speed in the further mode of operation of the domestic appliance can be limited, has expired the domestic appliance can be set to drive the stirring tool, as in the one mode of operation, with the at least one speed within the one speed range.

6. A domestic appliance as claimed in claim 2 which comprises a time control device by means of which the drive of the stirring tool with the at least one further speed in the further mode of operation of the domestic appliance can be limited to a given time interval between 15 and 40 minutes.

7. A domestic appliance as claimed in claim 2 wherein the time control device comprises adjustment means by which the given time interval, to which the drive of the stirring tool with the at least one further speed in the further mode of operation of the domestic appliance can be limited, can be adjusted to different values.

8. A domestic appliance as claimed in claim 3 wherein the time control device comprises adjustment means by which the given time interval, to which the drive of the stirring tool with the at least one further speed in the further mode of operation of the domestic appliance can be limited, can be adjusted to different values.

9. A domestic appliance as claimed in claim 2 which comprises a control device by which in the further mode of operation of the domestic appliance, after the given time interval has expired, the domestic appliance can be set to drive the stirring tool, as in the one mode of operation, with the at least one speed within the one speed range.

10. A domestic appliance as claimed in claim 3 which comprises a control device by which in the further mode of operation of the domestic appliance, after the given time interval has expired, the domestic appliance can be set to drive the stirring tool, as in the one mode of operation, with the at least one speed within the one speed range.

11. A domestic appliance as claimed in claim 4 wherein there has been provided a control device by which in the further mode of operation of the domestic appliance, after the given time interval, to which the drive of the stirring tool with the at least one further speed in the further mode of operation of the domestic appliance can be limited, has expired the domestic appliance can be set to drive the stirring tool, as in the one mode of operation, with the at least one speed within the one speed range.

* * * * *